Feb. 27, 1945. W. A. REEVES 2,370,192
GAS TURBINE COOLING ARRANGEMENT
Filed Jan. 28, 1942
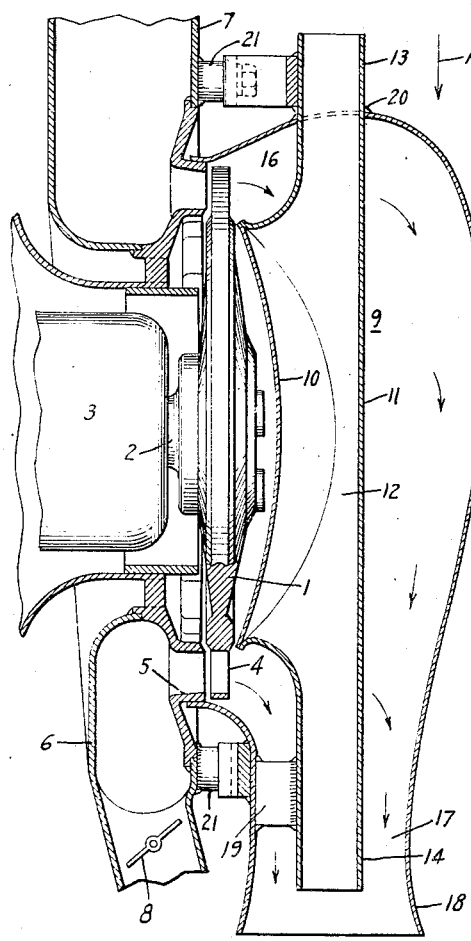
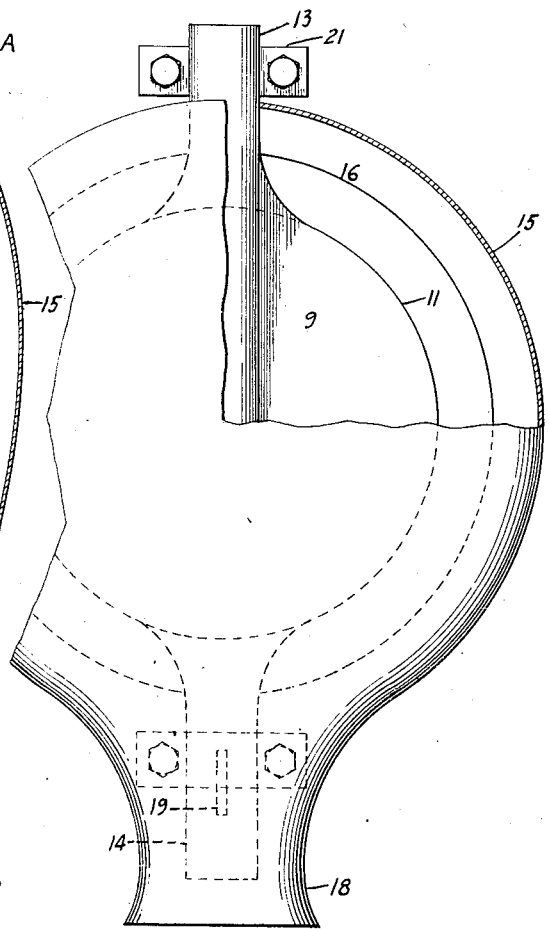
Inventor:
Waverly A. Reeves,
by Harry E. Dunham
His Attorney.

UNITED STATES PATENT OFFICE 2,370,192

GAS TURBINE COOLING ARRANGEMENT

Waverly A. Reeves, Lynn, Mass., assignor to General Electric Company, a corporation of New York Application January 28, 1942, Serial No. 428,633

3 Claims. (Cl. 60—41)

The present invention relates to gas turbines and especially to gas turbines mounted on aircraft and operated by exhaust gases from an aircraft engine. One use of such a gas turbine is to operate a centrifugal compressor for supplying compressed air to a point of consumption such as an internal combustion engine, or a cabin, for example. Such machines are termed usually superchargers.

One of the problems in connection with such gas turbines is to cool the turbine wheel and protect it from the hot gases issuing from the turbine wheel buckets and the object of my invention is to provide an improved construction and arrangement for accomplishing this result.

For a consideration of what I believe to be novel and my invention attention is directed to the following specification and the claims appended thereto.

In the drawing, Fig. 1 is a sectional view of a gas turbine embodying my invention, and Fig. 2 is a front view thereof.

Referring to the drawing, 1 indicates the turbine wheel of a gas turbine overhung on the end of a shaft 2 carried in a bearing 3. Gas is supplied to the buckets 4 of the turbine wheel by a ring of nozzles 5 carried by and forming a part of an annular nozzle box 6. Gases are supplied to the nozzle box through a conduit 7 which may lead from the exhaust manifold of an aircraft engine. At 8 is a usual type of waste gate valve for regulating the supply of gases to the turbine wheel in a well understood manner.

The structure so far described is a known one and is to be taken as typical of any suitable type of gas turbine.

According to my invention, I provide a cooling cap for the turbine wheel to which cooling air is supplied from a suitable source, such as from the aircraft slip stream, and I then utilize this cooling air as it issues from the cooling cap as the pumping fluid of an ejector for removing or carrying the exhaust gases away from the turbine wheel and discharging them at a suitable point. Ordinarily the turbine wheel is mounted on the aircraft so it lies in the path of the slip stream and in this case I may utilize also the slip stream air to assist in carrying away the exhaust gases.

The cooling cap is indicated at 9. It comprises a dished disk-shaped inner wall 10 located adjacent to the turbine wheel and of a diameter about equal to that of the turbine wheel disk and an outer wall 11 which defines with wall 10 a cooling air chamber 12. Cooling air is supplied to chamber 12 through a conduit 13 and is discharged therefrom through a conduit 14. Conduit 13 may face directly into the slip stream or it may connect with a suitable conduit which faces into the slip stream. In either case there is obtained a ram effect due to the forward movement of the aircraft.

Surrounding the cooling cap in spaced relation thereto is a hood 15 which defines with the outer wall of the cooling cap an annular gas discharge passage 16 which converges into an annular gas discharge passage 17 defined by a wall 18. Hood 15 is shaped to turn the gases issuing from the turbine wheel buckets 4 and direct them smoothly and evenly to discharge passage 17. Wall 18 surrounds conduit 14 and the parts are so shaped that the cooling air issuing from conduit 14 has an ejector action, functioning to draw the exhaust gases out through passage 17.

Cooling cap 9 and hood 15 are suitably attached to each other as is indicated at 19 and 20 and both are suitably supported from the nozzle box or supercharger base as is indicated at 21.

In Fig. 1, the direction of the slip stream is indicated by the arrow A and the direction of flow of the exhaust gases from buckets 4 is indicated by the arrows in passage 17.

In operation, considerable volume of air from the slip stream enters cooling chamber 12 through conduit 13. This air absorbs heat from the turbine wheel through wall 10 and is discharged at considerable velocity through conduit 14. In discharging from conduit 14, the air acts as the pumping fluid of an ejector, functioning to pump exhaust gases from discharge passage 16 out through passage 17. The mixture of cooling air and exhaust gases discharged from the ends of conduits 14 and 17 discharge into the slip stream and are carried away. When discharged the gases will be at a temperature low enough so that when mixed with the air they will not burn. Hence by my invention I avoid after-burning which occurs sometimes when unconsumed gases are discharged from the turbine wheel. After-burning is most likely to occur at lighter loads on the engine at which times there is more apt to be unconsumed fuel in the exhaust gases and the exhaust gases issue from the turbine buckets at a lower velocity. By my invention, even at lighter loads, the exhaust gases are effectively carried away from the wheel.

In case the hood 15 is located in the slip stream then the slip stream air in flowing over it assists also in drawing exhaust gases through passage 17.

What I claim as new and desire to secure by Letters Patent of the United States is:

1. In an aircraft turbosupercharger, the combination of a gas turbine wheel having a ring of buckets, a nozzle box on one side of the turbine wheel for directing gases to said buckets, said gases exhausting axially from the wheel, a hood on the exhaust side of the wheel having walls which define an exhaust chamber which receives gases exhausting from the wheel and a radially extending discharge conduit facing down stream as regards the flow of an aircraft slip stream, and a cooling cap on the discharge side of the turbine wheel having an inlet for conveying air from an aircraft slip stream to the cap and a discharge conduit for conveying air from the cooling cap to atmosphere, the end of said cooling air discharge conduit being located in and terminating short of the end of said first-named discharge conduit whereby flow of cooling air from the cooling air discharge conduit acts as an ejector to effect flow of exhaust gases through said exhaust gas discharge conduit.

2. In an aircraft turbosupercharger, the combination of a gas turbine wheel having a ring of buckets, a nozzle box on one side of the turbine wheel for directing gases to said buckets, a hood on the exhaust side of the wheel having walls which define an exhaust chamber which receives gases exhausting from the wheel and a radially extending discharge conduit facing downstream as regards the flow of an aircraft slipstream, and a cooling cap disposed in the hood on the discharge side of the turbine wheel having an inlet conduit projecting through the hood for conveying air from an aircraft slipstream to the cap and a discharge conduit for conveying air from the cooling cap to atmosphere, the outlet of said cooling air discharge conduit being located radially beyond the wheel in and terminating short of the end of said gas discharge conduit whereby flow of cooling air from the cooling air discharge conduit acts as an ejector to reduce the back pressure of the turbine.

3. An exhaust gas operated aircraft turbine comprising a bucket wheel, a nozzle box located on one side of the wheel for conducting exhaust gases thereto, an exhaust hood located on the other side of the wheel and having a discharge opening radially spaced from the wheel, and means for cooling the wheel comprising a hollow cooling cap located in the exhaust hood adjacent the central portion of the wheel and means for circulating cooling medium through the cap comprising an inlet conduit connected to the cap and a discharge conduit connected to the cap and having an outlet located radially beyond the wheel within the outlet of the exhaust hood and forming an ejector therewith whereby the discharge of high pressure cooling medium from the cap accelerates the flow of exhaust gases from the hood and reduces the back pressure of the turbine.

WAVERLY A. REEVES.